United States Patent Office 2,913,417
Patented Nov. 17, 1959

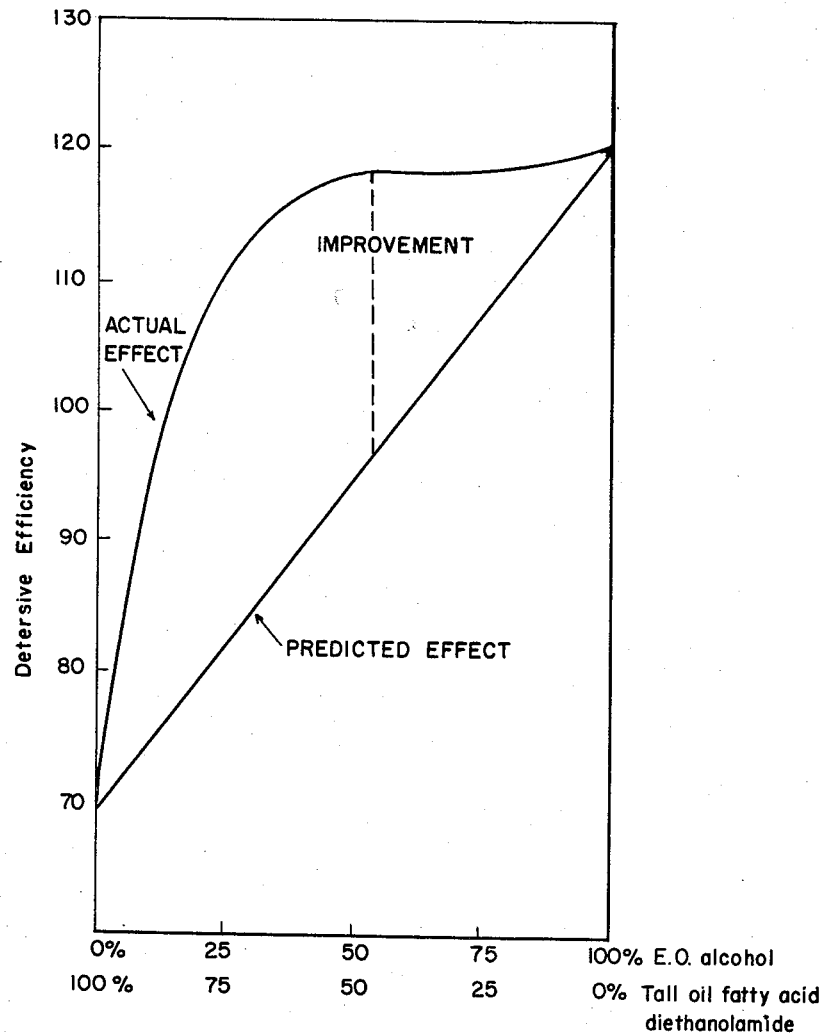

2,913,417
DETERGENT COMPOSITION

Lloyd E. Weeks, Union, Ohio, assignor to Monsanto Chemical Company, St. Louis, Mo., a corporation of Delaware Application November 27, 1953, Serial No. 394,635

9 Claims. (Cl. 252—152)

The present invention relates to the manufacture of detergent compositions. The invention likewise relates to detergent compositions exhibiting synergistic effects. An object of the present invention is to provide detergent compositions which exhibit improved detersive efficiency. Another object of the present invention is to provide detergents having greater stability in storage. Other objects and advantages of the invention will appear hereinafter.

In accordance with the present invention a surprising synergistic effect has been discovered in the detersive efficiency of compositions containing the combination of (a) alkylolamides of tall oil fatty acids in combination with (b) ethylene oxide, e.g., condensation products of highly-branched monohydric primary alcohols having the molecular configuration of an alcohol produced by the Oxo process from olefins of the class consisting of polybutylenes and polypropylenes, such as triisobutylene, tetrapropylene, tetraisobutylene, pentapropylene, pentaisobutylene and hexapropylene. Such condensation products may contain on the average from 1 to 20 moles of condensed ethylene oxide per mole of said alcohol, preferably from 5 to 15 moles of ethylene oxide. According to this discovery, it has been found that compositions containing from 20% to 80% by weight of the said alkylolamide and from 80% to 20% of said ethylene oxide condensation products may be dissolved in water for the production of aqueous solutions having greatly improved detergency characteristics. A preferred range is 35% to 70% of the ethylene oxide condensation product.

The alkylolamide component of the present compositions is an alkylolamide having from 10 to 20 carbon atoms in the acid and being derived from tall oil. A typical source which is particularly advantageous is the fraction of fatty acids which are derived from tall oil during the purification and fractionation thereof. The alkylolamide is formed by the reaction of such fatty acids with an alkanolamine, such as mono- or diethanolamine, mono- or diisopropanolamine, or mono- or di-n-propanolamine. A preferred amine is diethanolamine.

The second component of the present composition is preferably a condensation product of a highly-branched monohydric primary alcohol having the molecular configuration of an alcohol produced by the Oxo process from an olefin such as triisobutylene and tetrapropylene with from 1 to 20, preferably 5 to 15, moles of ethylene oxide per mole of alcohol.

A preferred embodiment employed in the present invention is the use of a mixture of isomeric monohydric primary tridecyl alcohols, said alcohols being derived from the catalyzed reaction of carbon monoxide and hydrogen with a material of the class consisting of polyisobutylenes and polypropylenes.

When polymer olefins such as polyisobutylene or polypropylene are reacted according to the Oxo reaction with carbon monoxide and hydrogen in the presence of the catalyst containing cobalt carbonyl, thorium and magnesium oxides or allied catalytic materials, a mixture of isomeric alcohols having a wide boiling range is obtained. The alcohols may be manufactured by the process described in Bureau of Mines Report of Investigation No. 4270 dated June, 1948. In view of the presence of a number of isomers of triisobutylene or tetrapropylene, for example, in the polymer olefins which are treated according to the Oxo reaction and furthermore since there is considerable isomerization, polymerization and depolymerization of the olefins due to the catalytic action, the resulting alcoholic product contains a large number of different alcohols, some of which are polyhydric alcohols. By reason of the large number of compounds present in the Oxo reaction product it has so far been impossible to ascertain the exact composition of this product.

It has been found, however, that the fraction consisting substantially only of tridecyl alcohols, boiling within the range of 226° C. to 264° C. (ASTM distillation) at atmospheric pressure, may be reacted with ethylene oxide and mixed polyethers obtained which have outstanding surface-active properties.

The formation of the present condensation products is carried out by passing ethylene oxide either as a gas or as a liquid into the tridecyl alcohol in the presence of an alkaline catalyst such as caustic soda or potash. Using from 0.25% to 1.5% by weight of the catalyst based on the alcohol is satisfactory.

An example is given below illustrating a preferred embodiment of the invention, but it will be understood that the invention is not to be limited by the details thereof. Parts are by weight unless otherwise indicated. A detergent mixture was prepared using the following components.

3.75% condensation product of 8.5 moles of ethylene oxide with 1 mole isomeric monohydric primary tridecyl alcohols, said alcohols being derived from the catalyzed reaction of carbon monoxide and hydrogen with polypropylenes
3.75% ethanolamide of tall oil fatty acids (10–20 carbon atoms)
27.5% sodium tripolyphosphate
20.00% tetrasodium pyrophosphate
20.25% soda ash
24.00% granular sodium silicate ($Na_2O:SiO_2=1:2$, 47.5% water)
0.75% carboxy methyl cellulose, medium viscosity The above detergent mixture was dissolved in water to give a solution of 0.2% concentration, and various mixtures were made up in which the proportions of the components was varied as described above.

The detergency test used is described by Jay C. Harris in Soap and Sanitary Chemicals for August and September, 1943. The detergency values obtained at respective concentrations in water of 50 parts per million hardness are summarized in the table below.

| Amount of Ethylene Oxide Condensation Product Present in Active Component, Percent by Weight | Detersive Efficiency |
| --- | --- |
| 25 | 90 |
| 33.3 | 113 |
| 66.7 | 116 |
| 75 | 116 |

The data of the above table have been graphically illustrated in the drawing of the present application, showing that the combination of the two ingredients in the composition results in compositions having far greater detergency than the individual components themselves.

A preferred range of the proportions of the two essential components varies from 20% to 80% of the ethylene oxide condensation product, while the preferred range of the same is from 35% to 70% by weight.

The compositions of the present invention are of wide utility as detergents in operations in which solid materials such as fabrics are to be contacted with aqueous solutions, for example, in textile scouring. Moreover, the compositions exhibit excellent detergency, particularly by virtue of their improved wetting ability. For general washing purposes the composition is employed in concentrations varying from 0.05% to 3.0% by weight of the washing solution. The composition may be produced as a dry mixture of the two essential components, but it is also contemplated that other detergents, dyes, builders, fillers, etc. may be mixed with or employed together with the above composition.

When used as a detergent the hereindisclosed compositions may be employed either in 100% active form or they may be combined with alkali metal builder salts such as alkali metal phosphates, sulfates, carbonates, silicates or with carbohydrate material such as starch, carboxymethylcellulose, etc. or mixtures of these materials. When employed with builder salts the present essential organic components are utilized in amount varying from about 3% to 50% or more by weight of active material in the built composition. Suitable alkali metal salts utilizable in the above compositions are the disodium orthophosphate, trisodium orthophosphate, tetrasodium pyrophosphate, sodium metaphosphate, sodium tripolyphosphate, sodium carbonate, sodium bicarbonate, sodium sesquicarbonate, sodium silicate, sodium sulfate, etc. The compositions of the present invention may also be marketed and utilized as solutions such as aqueous solutions of suitable concentration which may be mixed directly or may be mixed at the point of application. For example, a concentrate for use in wetting out operations may be provided from the following components given as weight percent.

| | Percent |
|---|---|
| Ethylene oxide condensation product (8.5 mole ratio) with tridecyl Oxo alcohol | 17.5 |
| Ethanolamide of 10–20 carbon fatty acids from tall oil | 67.5 |
| Water | 15 |

The present invention is not to be considered as limited by any of the examples described herein, which are given by way of illustration only, but is to be limited solely by the scope of the appended claims.

What is claimed is:

1. A surface-active composition, the essential ingredient of which is composed of a mixture of from 20% to 80% of a fatty acid alkanolamide derived from tall oil and having from 10–20 carbon atoms in the acid radical, and less than 4 carbon atoms in each chain in the amine radical, and from 80% to 20% of the condensation product of 1 to 20 moles of ethylene oxide condensed with 1 mole of a mixture boiling within the range of 226° C. to 264° C. at normal atmospheric pressure, of highly-branched, monohydric, primary alcohols having the molecular configuration of an alcohol produced by the Oxo process from an olefin of the class consisting of polybutylenes and polypropylenes.

2. A detergent composition, the essential ingredient of which is composed of a mixture of from 20% to 80% of a fatty acid alkanolamide derived from tall oil and having from 10 to 20 carbon atoms in the acid radical, and less than 4 carbon atoms in each chain in the amine radical, and from 80% to 20% of the condensation product of 1 to 20 moles of ethylene oxide with 1 mole of a mixture of isomeric, monohydric, primary alcohols, said mixture boiling within the range of 226° C. to 264° C. at normal atmospheric pressure, said alcohols being derived from the catalyzed reaction of carbon monoxide and hydrogen with a polybutylene.

3. A detergent composition, the essential ingredient of which is composed of a mixture of from 20% to 80% of a fatty acid alkanolamide having from 10 to 20 carbon atoms in the acid radical, and less than 4 carbon atoms in each chain in the amine radical, and being derived from tall oil together with from 80% to 20% of the condensation product of 1 to 20 moles of ethylene oxide with 1 mole of a mixture boiling within the range of 226° C. to 264° C. at normal atmospheric pressure, of isomeric, monohydric, primary tridecyl alcohols, said alcohols being derived from the catalyzed reaction of carbon monoxide and hydrogen with a polypropylene.

4. A detergent composition, the essential ingredient of which is composed of a mixture of from 20% to 80% of a fatty acid alkanolamide having from 10 to 20 carbon atoms in the acid radical, and less than 4 carbon atoms in each chain in the amine radical, and being derived from tall oil and from 80% to 20% of the condensation product of 1 to 20 moles of ethylene oxide with one mole of a mixture of isomeric, monohydric, primary tridecyl alcohols boiling within the range of 226–264° C. at atmospheric pressure.

5. A detergent composition, the essential ingredient of which is composed of a mixture of from 35% to 70% of a fatty acid alkanolamide having from 10 to 20 carbon atoms in the acid radical, and less than 4 carbon atoms in each chain in the amine radical, and being derived from tall oil together with from 65% to 30% of the condensation product of 5 to 15 moles of ethylene oxide with 1 mole of a mixture boiling within the range of 226° C. to 264° C. at normal atmospheric pressure, of isomeric, monohydric primary tridecyl alcohols, said alcohols being derived from the catalyzed reaction of carbon monoxide and hydrogen with an olefin material selected from the class consisting of polybutylenes and polypropylenes.

6. A detergent composition, the essential ingredient of which is composed of a mixture of from 35% to 70% of a fatty acid alkanolamide having from 10 to 20 carbon atoms in the acid radical, and less than 4 carbon atoms in each chain in the amine radical, and being derived from tall oil and from 65% to 30% of the condensation product of 5 to 15 moles of ethylene oxide with 1 mole of a mixture of isomeric, monohydric, primary alcohols, said mixture boiling within the range of 226° C. to 264° C. at normal atmospheric pressure, said alcohols being derived from the catalyzed reaction of carbon monoxide and hydrogen with a polypropylene.

7. A detergent composition, the essential ingredient of which is composed of a mixture of from 35% to 70% of a fatty acid alkanolamide having from 10 to 20 carbon atoms in the acid radical, and less than 4 carbon atoms in each chain in the amine radical, and being derived from tall oil and from 65% to 30% of the condensation product of 5 to 15 moles of ethylene oxide with a mixture of isomeric, monohydric, primary tridecyl alcohols boiling within the range of 226–264° C. at atmospheric pressure.

8. An aqueous detergent bath comprising an aqueous solution of the composition defined in claim 1.

9. A treating bath having high detergent efficiency comprising a liquid treating agent having dissolved therein a mixture of from 20% to 80% of diethanolamide of tall oil fatty acids derived from tall oil and having from 10 to 20 carbon atoms in the acid radical, and less than 4 carbon atoms in each chain in the amine radical, together with from 80% to 20% of a condensation product of 8.5 moles of ethylene oxide with one mole of a mixture of isomeric, monohydric, primary tridecyl alcohols boiling within the range of 226–264° C. at atmospheric pressure.

References Cited in the file of this patent

UNITED STATES PATENTS

| Re.21,530 | Kritchevsky | Aug. 13, 1940 |
| 2,594,431 | Harris et al. | Apr. 29, 1952 |

FOREIGN PATENTS

| 879,689 | France | Nov. 30, 1942 |